US009897045B2

United States Patent
Makino (10) Patent No.: US 9,897,045 B2
(45) Date of Patent: Feb. 20, 2018

(54) FUEL VAPOR RECOVERY APPARATUS (71) Applicant: AISAN KOGYO KABUSHIKI KAISHA, Obu-shi, Aichi-ken (JP)

(72) Inventor: Katsuhiko Makino, Aichi-ken (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 41 days.

(21) Appl. No.: 15/010,882

(22) Filed: Jan. 29, 2016

(65) Prior Publication Data
US 2016/0258390 A1 Sep. 8, 2016

(30) Foreign Application Priority Data

Mar. 6, 2015 (JP) .................................. 2015-044481

(51) Int. Cl.
*F02M 25/08* (2006.01)
*B60K 15/035* (2006.01)

(52) U.S. Cl.
CPC ... *F02M 25/0836* (2013.01); *B60K 15/03504* (2013.01); *F02M 25/089* (2013.01); *B60K 2015/03514* (2013.01)

(58) Field of Classification Search
CPC ............. F02M 25/0836; F02M 25/089; B60K 15/03504; B60K 2015/03514
USPC ........................................................ 123/520
See application file for complete search history.

(56) References Cited

U.S. PATENT DOCUMENTS

| | | | | | |
|---|---|---|---|---|---|
| 5,695,473 | A | * | 12/1997 | Olsen ................ | A61M 5/16859 128/DIG. 13 |
| 2002/0139173 | A1 | * | 10/2002 | Kano ................ | F02M 25/0809 73/49.7 |
| 2004/0211395 | A1 | * | 10/2004 | Greco ................ | F02D 41/064 123/497 |
| 2007/0137622 | A1 | * | 6/2007 | Koyama ............ | F02D 41/0045 123/520 |
| 2013/0319378 | A1 | * | 12/2013 | Haag ................ | B60K 15/03504 123/519 |
| 2014/0299111 | A1 | * | 10/2014 | Denz ................ | F02M 35/1038 123/521 |

(Continued)

FOREIGN PATENT DOCUMENTS

| | | |
|---|---|---|
| JP | 2002-188530 A | 7/2002 |
| JP | 2007-177728 A | 7/2007 |
| JP | 2008-240641 A | 10/2008 |

*Primary Examiner* — Joseph Dallo
*Assistant Examiner* — Yi-Kai Wang
(74) *Attorney, Agent, or Firm* — Conley Rose, P.C.

(57) ABSTRACT

A fuel vapor recovery apparatus includes an adsorbent canister capable of capturing fuel vapor, a vapor passage connecting the adsorbent canister to a fuel tank, an atmospheric air passage communicating the adsorbent canister with the atmosphere, and a purge passage coupling the adsorbent canister to an intake pipe of an internal combustion engine. In addition, the apparatus includes a purge pump configured to generate a gas flow from the adsorbent canister to the intake pipe through the purge passage, and a flow control valve provided at the purge passage and configured to regulate the gas flow through the purge passage. Further, the apparatus includes a pressure regulator configured to make an absolute value of pressure at an outlet side of the purge pump smaller than an absolute value of pressure at an inlet side of the purge pump while the purge pump is driven.

5 Claims, 10 Drawing Sheets

(56) References Cited

U.S. PATENT DOCUMENTS

2015/0090235 A1\* 4/2015 Pearce ............... F02M 25/0818
  123/520
2015/0285170 A1\* 10/2015 Nanba ................... F02D 41/004
  123/520

\* cited by examiner

FIG. 18
PRIOR ART

FUEL VAPOR RECOVERY APPARATUS

CROSS-REFERENCE TO RELATED APPLICATIONS

This application claims priority to Japanese patent application serial number 2015-044481, filed Mar. 6, 2015, the contents of which are incorporated herein by reference in their entirety for all purposes.

STATEMENT REGARDING FEDERALLY SPONSORED RESEARCH OR DEVELOPMENT

Not applicable.

BACKGROUND

This disclosure relates to a fuel vapor recovery apparatus including an adsorbent canister capable of capturing fuel vapor, a vapor passage introducing the fuel vapor produced in a fuel tank to the adsorbent canister, an atmospheric air passage fluidly communicating the adsorbent canister with the atmosphere, and a purge passage introducing the fuel vapor captured in the adsorbent canister to an intake pipe of an internal combustion engine.

Figure 18:
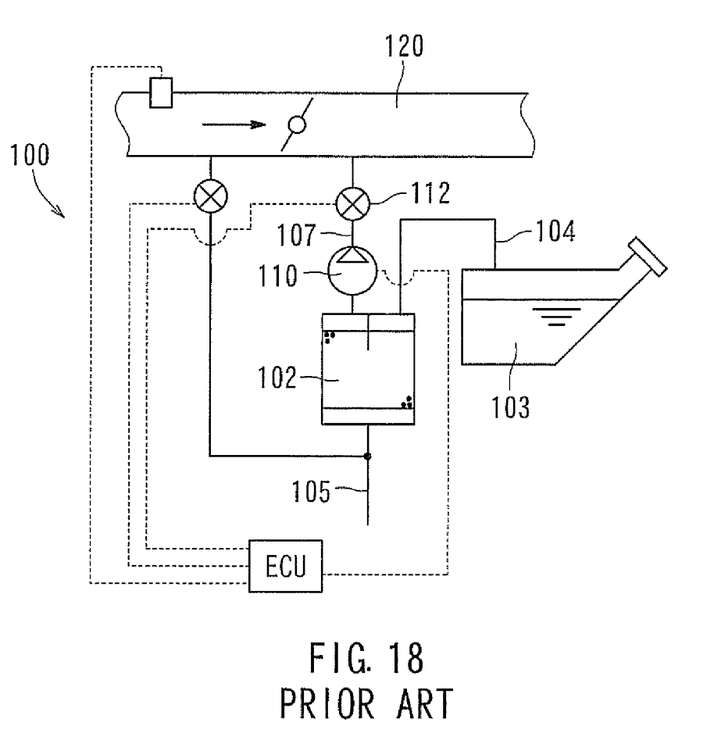
FIG. 18 is a schematic view of the conventional fuel vapor recovery apparatus.

Japanese Laid-Open Patent Publication No. 2007-177728 discloses a conventional fuel vapor recovery apparatus. Referring to FIG. 18, such conventional fuel vapor recovery apparatus 100 has an adsorbent canister 102 capable of trapping fuel vapor, a vapor passage 104 introducing the fuel vapor produced in a fuel tank 103 to the adsorbent canister 102, an atmospheric air passage 105 fluidly communicating the adsorbent canister 102 with the atmosphere, and a purge passage 107 introducing the fuel vapor captured in the adsorbent canister 102 to an intake pipe 120 of an internal combustion engine (not shown). The purge passage 107 is provided with a purge pump 110 for generating gas flow from the adsorbent canister 102 through the purge passage 107 to the intake pipe 120 of the engine. The purge passage 107 is further provided with a flow control valve 112 downstream of the purge pump 110. According to the above-described configuration, when the purge pump 110 is started under a condition where the engine is running, the atmospheric air is drawn into the adsorbent canister 102 through the atmospheric air passage 105 in order to forcibly purge the fuel vapor captured in the adsorbent canister 102 and introduce the fuel vapor into the intake pipe 120 of the engine. During this operation, the flow control valve 112 can regulate a flow rate of the gas flowing through the purge passage 107 toward the intake pipe 120 of the engine.

The fuel vapor recovery apparatus 100 is configured such that when the purge pump 110 provided along the purge passage 107 is driven, the fuel vapor adsorbed in the adsorbent canister 102 is forcibly purged by the air. Thus, there is a possibility that inner pressure of the purge passage 107 upstream of the flow control valve 112 becomes higher than the atmospheric pressure. When the engine is stopped under a condition where the inner pressure of the purge passage 107 is higher than the atmospheric pressure, inner pressure of the adsorbent canister 102 fluidly communicating the purge passage 107 becomes higher than the atmospheric pressure after the purge pump 110 is stopped. Accordingly, there is a possibility that the fuel vapor adsorbed in the adsorbent canister 102 diffuses to the atmosphere through the atmospheric air passage 105 due to the positive pressure in the adsorbent canister 102. Therefore, there has been a need for an improved fuel vapor recovery apparatus.

BRIEF SUMMARY

In one aspect of this disclosure, a fuel vapor recovery apparatus includes an adsorbent canister capable of capturing fuel vapor, a vapor passage connecting the adsorbent canister to a fuel tank, an atmospheric air passage communicating the adsorbent canister with the atmosphere, a purge passage coupling the adsorbent canister to an intake pipe of an internal combustion engine, a purge pump configured to generate a gas flow from the adsorbent canister to the intake pipe through the purge passage, a flow control valve provided at the purge passage and configured to regulate the gas flow through the purge passage, and a pressure regulator configured to make an absolute value of pressure at an outlet side of the purge pump smaller than an absolute value of pressure at an inlet side of the purge pump while the purge pump is driven.

According to this aspect of the present disclosure, while the purge pump is driven, the absolute value of the pressure at the outlet side of the purge pump is kept smaller than the absolute value of the pressure at the inlet side of the purge pump. That is, the pressure regulator can reduce a counteraction effect of positive pressure at the outlet side of the purge pump lower than that of the negative pressure at the inlet side of the purge pump. Thus, when the purge pump is stopped, the positive pressure at the outlet side of the purge pump and the negative pressure at the inlet side of the purge pump counteract each other, and then the pressure in the purge passage both upstream and downstream of the purge pump becomes negative. Accordingly, inner pressure of the adsorbent canister fluidly communicating the purge passage also becomes negative, so that diffusion of the fuel vapor trapped in the adsorbent canister to the atmosphere via the atmospheric air passage can be prevented or reduced.

DETAILED DESCRIPTION

Each of the additional features and teachings disclosed above and below may be utilized separately or in conjunction with other features and teachings to provide improved fuel vapor recovery apparatuses. Representative examples, which utilize many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary in the broadest sense, and are instead taught merely to particularly describe representative examples. Moreover, various features of the representative examples and the dependent claims may be combined in ways that are not specifically enumerated in order to provide additional useful embodiments of the present teachings.

Figure 1:
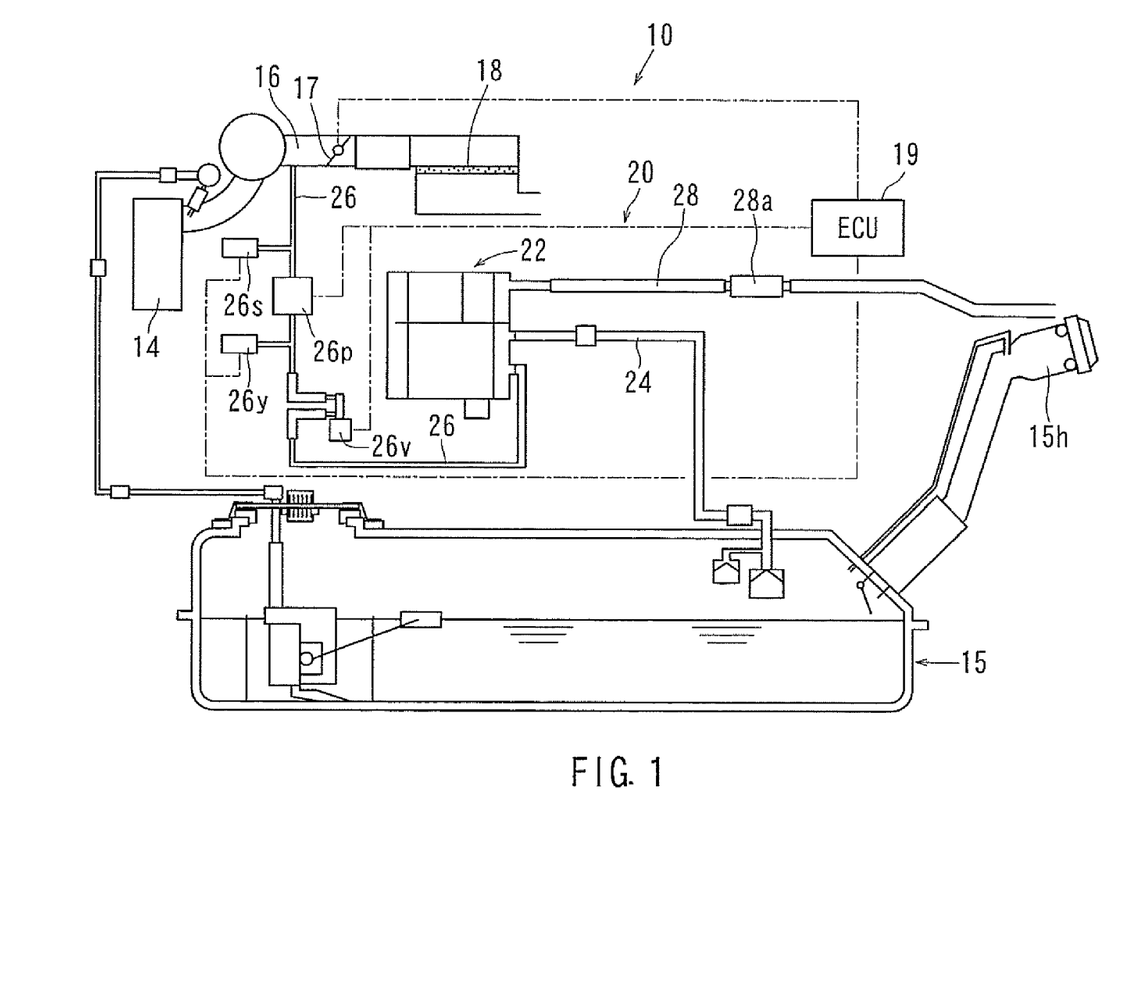
FIG. 1 is a schematic view of a fuel vapor recovery apparatus according to a first embodiment.

A fuel vapor recovery apparatus 20 according to a first embodiment will be described based on FIGS. 1 to 8. Referring to FIG. 1, the fuel vapor recovery apparatus 20 is combined with an engine system 10 for a vehicle and is configured to prevent fuel vapor produced in a fuel tank 15 of the vehicle from leaking into the outside atmosphere.

Figure 2:
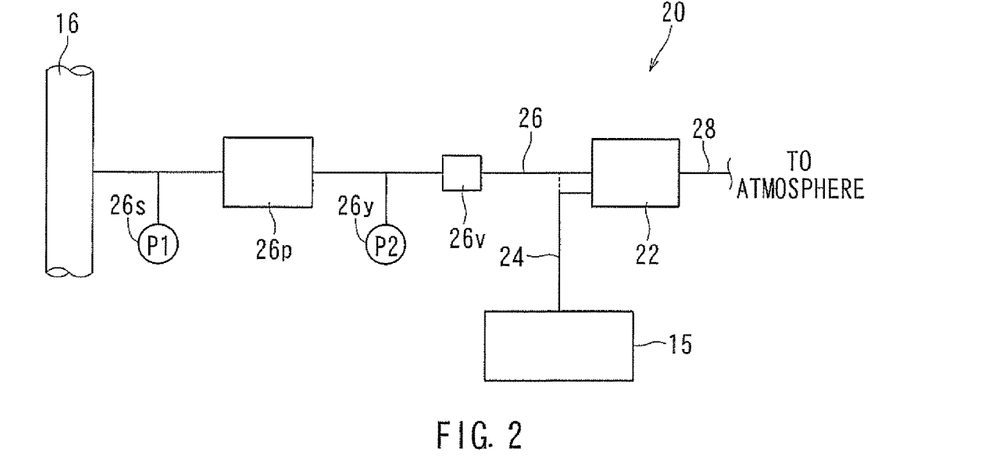
FIG. 2 is a schematic block diagram of the fuel vapor recovery apparatus.

As shown in FIGS. 1 and 2, the fuel vapor recovery apparatus 20 includes an adsorbent canister 22, a vapor passage 24, a purge passage 26 and an atmospheric air passage 28. Each of the vapor passage 24, the purge passage 26 and the atmospheric air passage 28 is coupled to the adsorbent canister 22. The adsorbent canister 22 is filled with an adsorbent (not shown), such as an activated carbon, for adsorbing fuel vapor produced in the fuel tank 15. The vapor passage 24 is configured to introduce the fuel vapor from the fuel tank 15 to the adsorbent canister 22. One end (upstream end) of the vapor passage 24 is fluidly communicated with a gas space in the fuel tank 15, and the other end (downstream end) of the vapor passage 24 is fluidly communicated with the inside of the adsorbent canister 22. The atmospheric air passage 28 is configured to communicate the adsorbent canister 22 with the atmosphere. A base end of the atmospheric air passage 28 is coupled to the adsorbent canister 22, and the other end of the atmospheric air passage 28 is open to the atmosphere at a position near a fill opening 15h of the fuel tank 15. An air filter 28a is provided in the middle of the atmospheric air passage 28.

The purge passage 26 is configured to introduce the fuel vapor from the adsorbent canister 22 to an intake pipe 16 of an internal combustion engine 14 (referred to as "engine", hereinafter). The purge passage 26 has one end (upstream end) fluidly communicating the inside of the adsorbent canister 22 and the other end (downstream end) fluidly communicating the intake pipe 16 downstream of both a throttle valve 17 and a filter 18. The purge passage 26 has a first pressure sensor 26s, a purge pump 26p, a second pressure sensor 26y, and a flow control valve 26v in order from the downstream end to the upstream end such that the first pressure sensor 26s is positioned at an outlet side of the purge pump 26p and the second pressure sensor 26y is positioned at an inlet side of the purge pump 26p. The purge pump 26p is operated based on signals output from an engine control unit (ECU) 19 and is configured to produce a gas flow from the adsorbent canister 22 through the purge passage 26 to the intake pipe 16 of the engine 14 while the engine 14 is running. The first pressure sensor 26s and the second pressure sensor 26y are configured to measure pressure P1 at the outlet side and pressure P2 at the inlet side of the purge pump 26p, respectively, and to output pressure detection signals to the ECU 19. The flow control valve 26v is configured to regulate the flow rate of the gas flowing through the purge passage 26 while the purge pump 26p is driven. The flow control valve 26v is operated based on signals output from the ECU 19.

While the engine 14 of the vehicle is stopped, the flow control valve 26v is closed in order to block fluid communication through the purge passage 26, and the purge pump 26p is stopped. Thus, the fuel vapor vaporized in the fuel tank 15 is introduced into the adsorbent canister 22 through the vapor passage 24 and is adsorbed on the adsorbent filled in the adsorbent canister 22. Then, after starting engine 14, when predetermined purge conditions are satisfied, the ECU 19 performs an operation for purging the fuel vapor adsorbed on the adsorbent in the adsorbent canister 22.

During this operation, the purge pump 26p is driven and the flow control valve 26v is opened. Thus, negative pressure generated at the inlet side (upstream side) of the purge pump 26p affects the inside of the adsorbent canister 22 via the purge passage 26, so that inner pressure of the adsorbent canister 22 becomes negative. Accordingly, the atmospheric air flows into the adsorbent canister 22 through the atmospheric air passage 28. Further, gases flow from the fuel tank 15 into the adsorbent canister 22, so that the fuel tank 15 is depressurized. A mixture of the air and the gases, flowing into the adsorbent canister 22, purges the fuel vapor adsorbed on the adsorbent and is introduced into the purge pump 26p through the purge passage 26 and the flow control valve 26v together with the fuel vapor. Then, the mixture containing the fuel vapor is pressurized by the purge pump 26p and is supplied to the intake pipe 16 of the engine 14 via the downstream end of the purge passage 26. That is, the fuel vapor, removed from the adsorbent filled in the adsorbent canister 22, is introduced into the intake pipe 16 of the engine 14 together with the air and is burned in the engine 14. During this operation, the ECU 19 controls the opening amount of the flow control valve 26v in order to regulate the air-fuel ratio of an air-fuel mixture supplied to the engine 14.

Figure 3:
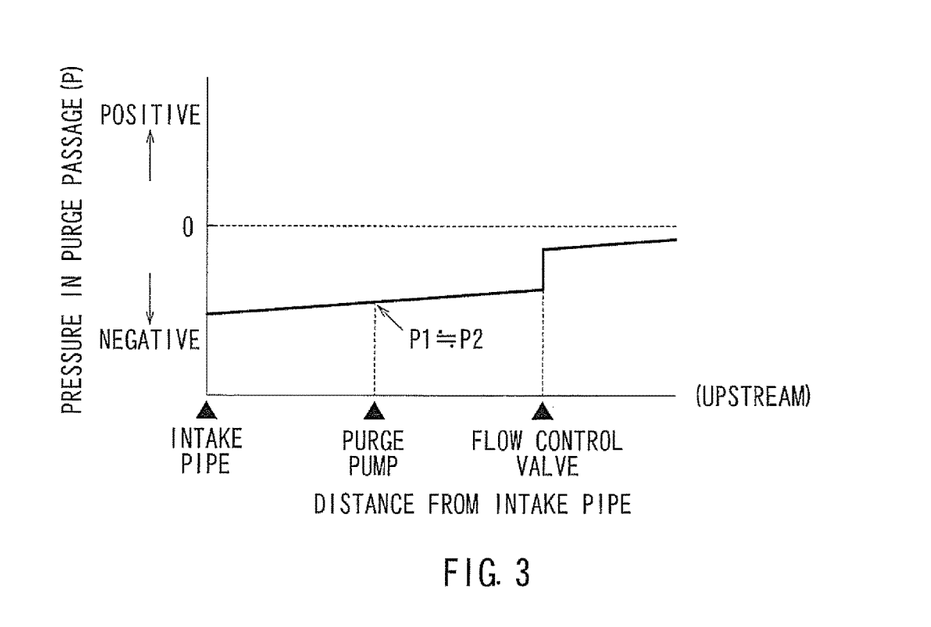
FIG. 3 is a graph showing inner pressure of a purge passage of the fuel vapor recovery apparatus while a purge pump is stopped.
Figure 4:
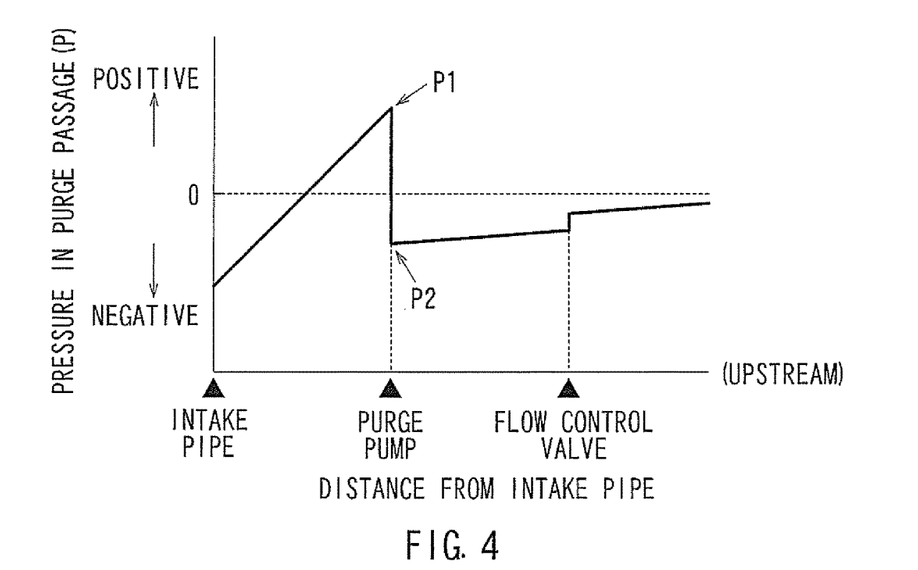
FIG. 4 is a graph showing inner pressure of the purge passage of the fuel vapor recovery apparatus while the purge pump is driven.

Next, referring to FIGS. 3 and 4, pressure change in the purge passage 26 under a condition where the flow control valve 26v is opened at a predetermined amount while the engine 14 is running will be described. In FIGS. 3, 4 and other similar graphs, the horizontal axis shows a distance from the intake pipe 16 in the purge passage 26. In more detail, a left end of the horizontal axis means a connection position between the purge passage 26 and the intake pipe 16, whereas a right side means the upstream side of the purge passage 26. The vertical axis means inner pressure of the purge passage 26. While the purge pump 26p is stopped, positive pressure is not generated at the outlet side of the purge pump 26p, so that the inner pressure of the purge passage 26 is negative due to influence of the negative pressure in the intake pipe 16 of the engine 14, as shown in FIG. 3. Between the upstream side and the downstream side of the flow control valve 26v, there is a differential pressure caused by pressure loss at the flow control valve 26v. When the purge pump 26p is driven under this condition, the pressure P1 at the outlet side of the purge pump 26p becomes positive (P1>0 kPa, in gauge pressure) and the pressure P2 at the inlet side of the purge pump 26p becomes negative (P2<0 kPa), as shown in FIG. 4.

As described above, the mixture containing the fuel vapor, which is introduced into the purge pump 26p through the flow control valve 26v of the purge passage 26, is pressurized at the purge pump 26p and is supplied to the intake pipe 16 of the engine 14 via the downstream end of the purge passage 26. During this operation, if the negative pressure in the intake pipe 16 affects the outlet side of the purge pump 26p, the inner pressure of the purge passage 26 near the purge pump 26p is positive. Further, under a condition where the absolute value |P1| of the pressure P1 (positive pressure) at the outlet side of the purge pump 26p is larger than the absolute value |P2| of the pressure P2 (negative pressure) at the inlet side of the purge pump 26p as shown in FIG. 4, when the engine 14 and the purge pump 26p are stopped, the pressure P1 at the outlet side and the pressure P2 at the inlet side of the purge pump 26p counteract each other, and then the inner pressure of the purge passage 26 becomes positive. Consequently, the inner pressure of the adsorbent canister 22 communicating the purge passage 26 becomes positive, so that there is a possibility that the fuel vapor stored in the adsorbent canister 22 diffuses to the outside via the atmospheric air passage 28 due to the positive pressure in the adsorbent canister 22. In order to prevent such diffusion, the ECU 19 has a memory storing programs and a processor for executing the program and is configured to periodically perform an operation shown in FIG. 5 based on the programs stored in the memory.

Figure 5:
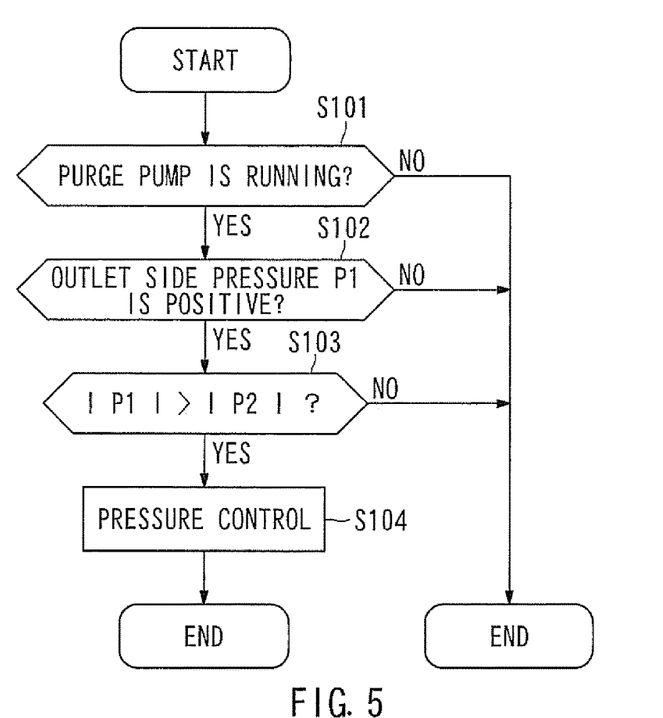
FIG. 5 is a flowchart for an operation to control the fuel vapor recovery apparatus.

Under a condition where the purge pump 26p is running (Step S101 in FIG. 5 is YES), when the pressure P1 at the outlet side of the purge pump 26p is positive (P1>0 kPa) (Step S102 is YES), the absolute value |P1| of the pressure P1 at the outlet side of the purge pump 26p is compared with the absolute value |P2| of the pressure P2 at the inlet side at Step S103. When the absolute value |P1| is greater than the absolute value |P2| (Step S103 is YES), pressure control (described later) for making the absolute value |P1| smaller than the absolute value |P2| is carried out at Step S104. On the other hand, when the absolute value |P1| is less than the absolute value |P2| (Step S103 is NO), the operation is finished. In a case that the absolute value |P1| is smaller than the absolute value |P2|, the pressure P1 at the outlet side of the purge pump 26p has a smaller counteraction effect than the pressure P2 at the inlet side of the purge pump 26p. Thus, when the engine 14 and the purge pump 26p are stopped, the pressure P1 (positive pressure) at the outlet side and the pressure P2 (negative pressure) at the inlet side counteract each other, and then the inner pressure of the purge passage 26 becomes negative. Accordingly, the inner pressure of the adsorbent canister 22 communicating the purge passage 26 becomes negative, so that the diffusion of the fuel vapor from the adsorbent canister 22 to the outside via the atmospheric air passage 28 can be prevented.

When the absolute value |P1| of the pressure P1 at the outlet side of the purge pump 26p becomes larger than the absolute value |P2| of the pressure P2 at the inlet side of the purge pump 26p, as described above, the pressure control is carried out (Step S104) The ECU 19 performs the pressure control by decreasing the rotation number N of the purge pump 26p (e.g., rotation number N may be the revolutions of the purge pump 26p impeller per some unit time), decreasing the valve opening amount of the flow control valve 26v or decreasing the inner pressure (i.e., enhancing negative pressure) of the intake pipe 16 of the engine 14.

Figure 6:
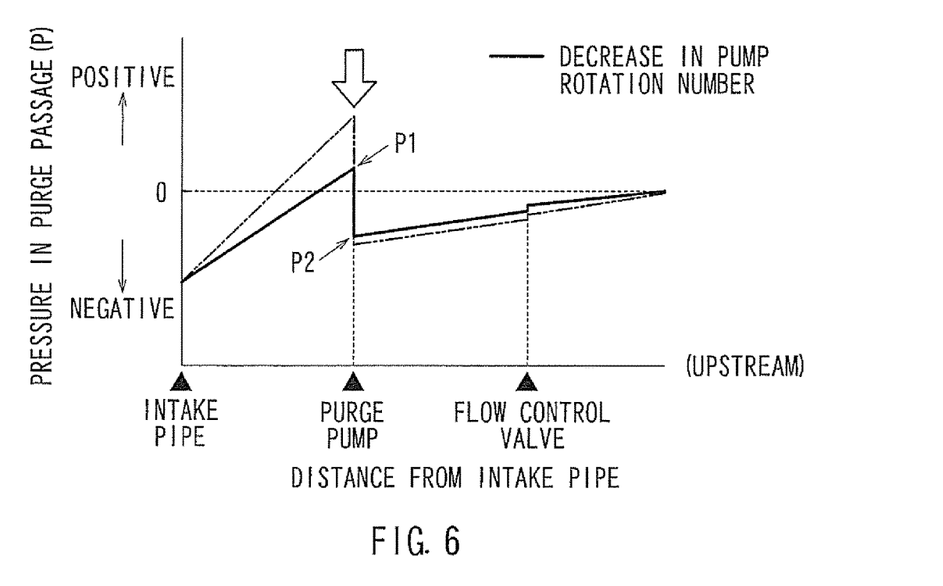
FIG. 6 is a graph showing inner pressure of the purge passage of the fuel vapor recovery apparatus while a pressure regulator is operated.

In order to decrease the rotation number N of the purge pump 26p, the ECU 19 decreases voltage applied to a driving motor of the purge pump 26p. Thus, the rotation number of the driving motor is lowered, so that the rotation number N of the purge pump 26p also decreases. When the rotation number N of the purge pump 26p decreases, the pressure P1 at the outlet side of the purge pump 26p decreases as shown in FIG. 6 such that the absolute value |P1| becomes smaller. Although the pressure P2 at the inlet side of the purge pump 26p slightly increases such that the absolute value |P2| becomes smaller, the absolute value |P2| is consequently greater than the absolute value |P1|.

Figure 7:
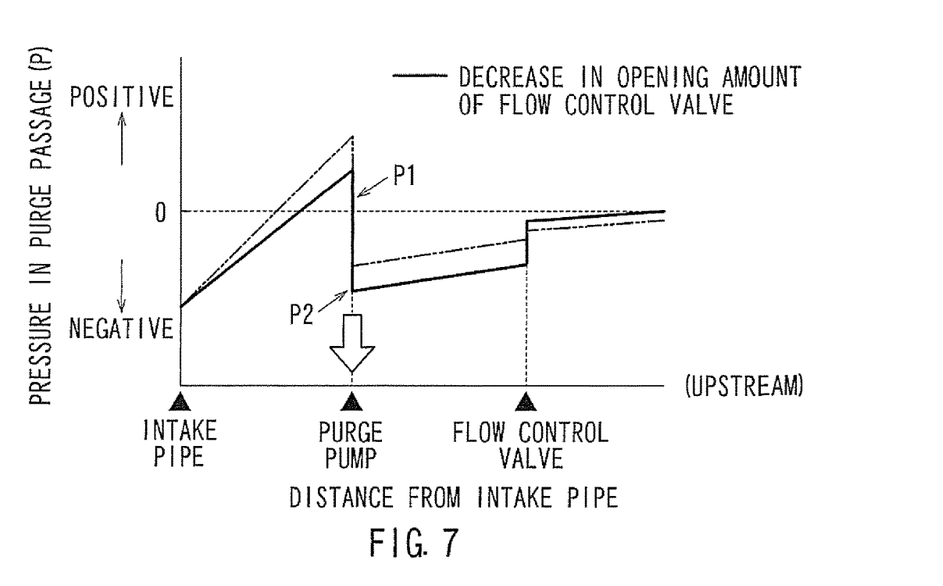
FIG. 7 is a graph showing inner pressure of the purge passage of the fuel vapor recovery apparatus while the pressure regulator is operated.

When the ECU 19 decreases the opening amount of the flow control valve 26v, pressure loss at the flow control valve 26 becomes larger such that gases are less likely to flow through the flow control valve 26v. Thus, because the pressure P2 at the inlet side of the purge pump 26p, which is located downstream of the flow control valve 26v, decreases as shown in FIG. 7, the absolute value |P2| of the pressure P2 at the inlet side of the purge pump 26p becomes larger. With this change, the absolute value |P1| of the pressure P1 at the outlet side of the purge pump 26p becomes smaller. Consequently, the absolute value |P2| becomes larger than the absolute value |P1|.

Figure 8:
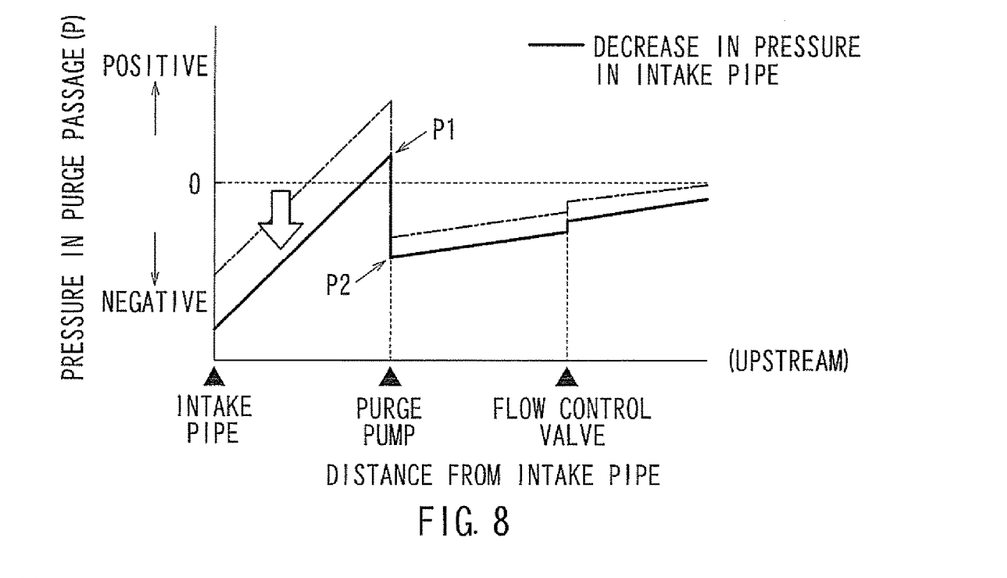
FIG. 8 is a graph showing inner pressure of the purge passage of the fuel vapor recovery apparatus while the pressure regulator is operated.

When the ECU 19 decreases the inner pressure of the intake pipe 16 of the engine 14, the inner pressure of the purge passage 26 communicating the intake pipe 16 also decreases as shown in FIG. 8. Thus, the absolute value |P1| of the pressure P1 at the outlet side of the purge pump 26p decreases, and the absolute value |P2| of the pressure P2 at the inlet side of the purge pump 26p increases. Consequently, the absolute value |P2| becomes larger than the absolute value |P1|. In order to decrease the pressure in the intake pipe 16 of the engine 14, the ECU 19 may decrease the circulating volume of exhaust gas in an exhaust gas recirculation system (EGR), change the circulation timing of the exhaust gas in the EGR, or increase the rotation number of the engine 14 (e.g., the rotation number of engine 14 may be the number of revolutions of an output shaft of engine 14 per some unit time), etc.

The pressure control can be performed by carrying out any one of decreasing the rotation number N of the purge pump 26p, decreasing the valve opening amount of the flow control valve 26v and decreasing the pressure in the intake pipe 16 of the engine 14, or by simultaneously carrying out at least two of them. That is, the ECU 19 corresponds to a pressure regulator of this disclosure.

According to the fuel vapor recovery apparatus 20, the ECU 19 can make the absolute value |P1| of the pressure P1 at the outlet side of the purge pump 26p smaller than the absolute value |P2| of the pressure P2 at the inlet side while the purge pump 26 is running. That is, the counteraction capability of the positive pressure at the outlet side of the purge pump 26p can be decreased lower than that of the negative pressure at the inlet side of the purge pump 26p. Thus, when the purge pump 26p is stopped, the positive pressure at the outlet side and the negative pressure at the inlet side of the purge pump 26p counteract each other, and then pressures at both of the upstream side and the downstream side of the purge pump 26p become negative. Accordingly, the inner pressure of the adsorbent canister 22 fluidly communicating the purge pump 26p becomes negative, so that the diffusion of the fuel vapor trapped in the adsorbent canister 22 to the atmosphere via the atmospheric air passage 28 can be prevented or reduced.

Figure 9:
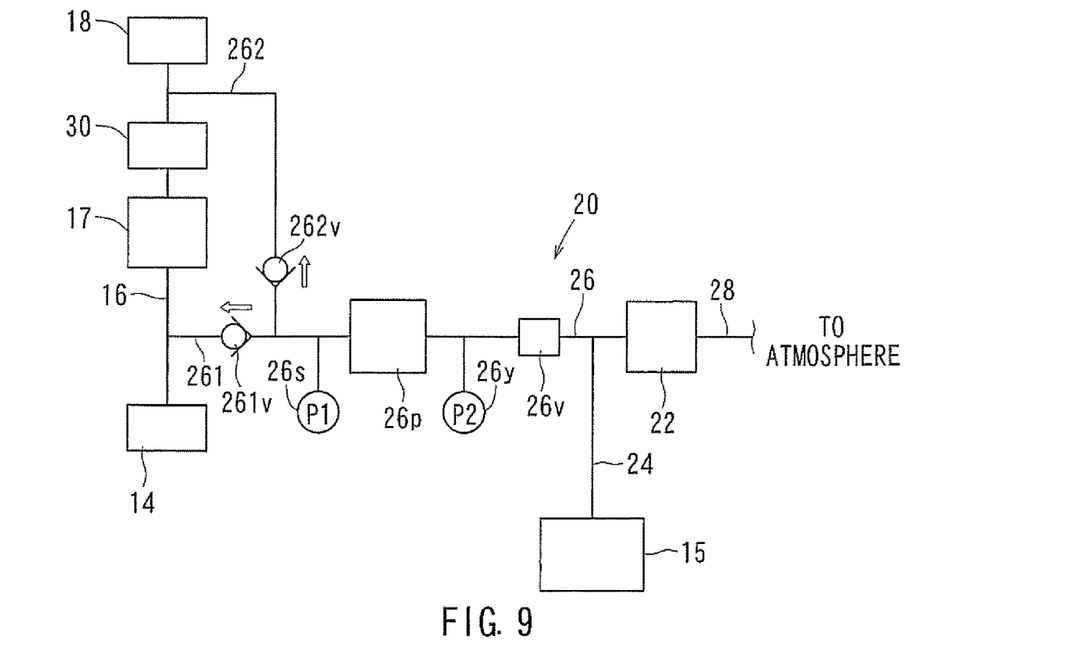
FIG. 9 is a schematic block diagram of the fuel vapor recovery apparatus according to a second embodiment.

The above-described embodiment can be modified variously. For example, in a second embodiment, the fuel vapor recovery apparatus 20 can be used for the engine 14 having a supercharging device 30, such as a mechanical supercharger or a turbocharger, as shown in FIG. 9. In this case, the purge passage 26 is divided into a first passage 261 and a second passage 262 at a position downstream of the purge pump 26p. The first passage 261 is connected to the intake pipe 16 downstream of the throttle valve 17 and is provided with a first check valve 261v. The second passage 262 is coupled to the intake pipe 16 upstream of the supercharging device 30 and is provided with a second check valve 262v. According to the above-described configuration, when the supercharging device 30 is driven, the inner pressure of the intake pipe 16 downstream of the throttle valve 17 becomes positive, and the first check valve 261v of the first passage 261 is closed. Thus, gases discharged from the purge pump 26p are introduced to the intake pipe 16 upstream of the supercharging device 30 via the second check valve 262v of the second passage 262. On the other hand, while the supercharging device 30 is stopped, gases discharged from the purge pump 26p are introduced into the intake pipe 16 downstream of the throttle valve 17 via the first check valve 261v of the first passage 261, which the negative pressure in the intake pipe 16 has a large influence on. Further, the first check valve 261v and the second check valve 262v can be replaced with a first solenoid valve and a second solenoid valve, respectively, such that the ECU 19 controls the first and the second solenoid valves in a manner similar to operation of the first and second check valves 261v and 262v.

Figure 10:
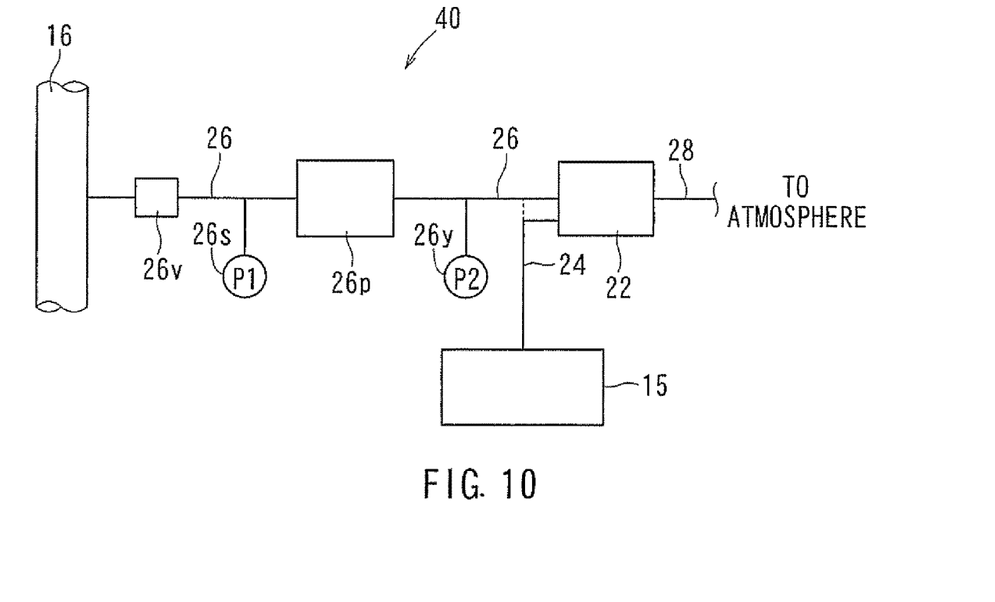
FIG. 10 is a schematic block diagram of the fuel vapor recovery apparatus according to a third embodiment.
Figure 11:
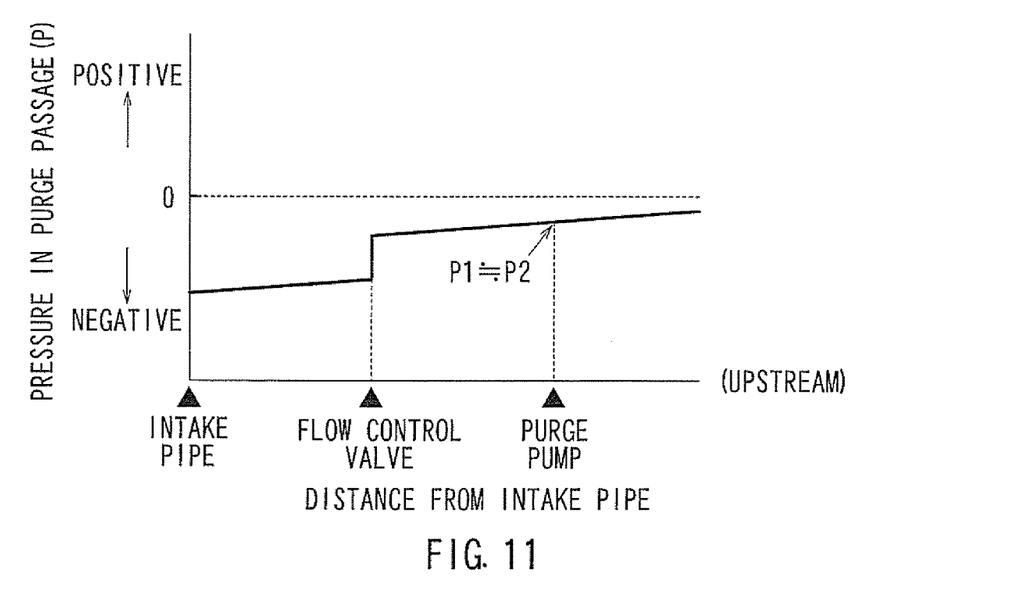
FIG. 11 is a graph showing inner pressure of the purge passage of the fuel vapor recovery apparatus while the purge pump is stopped.
Figure 12:
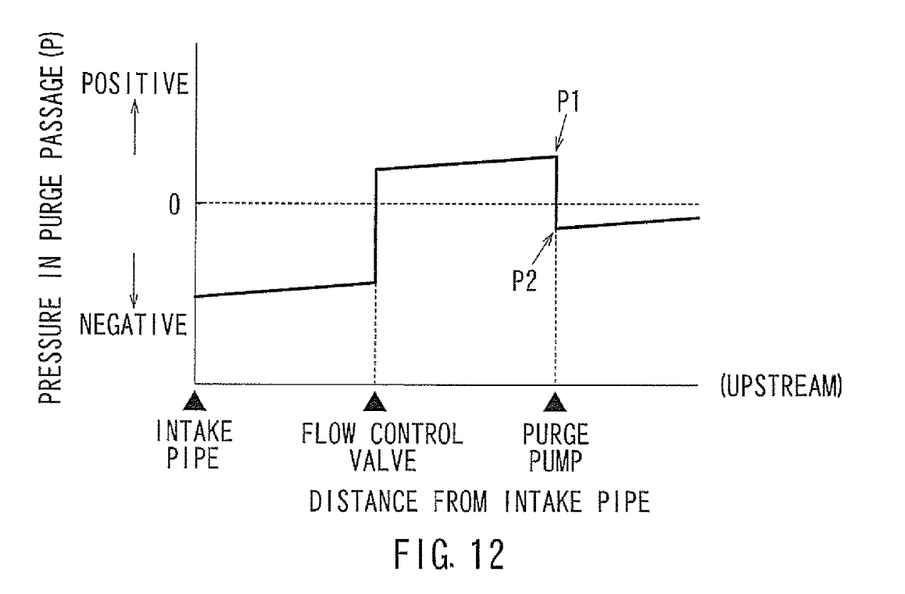
FIG. 12 is a graph showing inner pressure of the purge passage of the fuel vapor recovery apparatus while the purge pump is driven.
Figure 13:
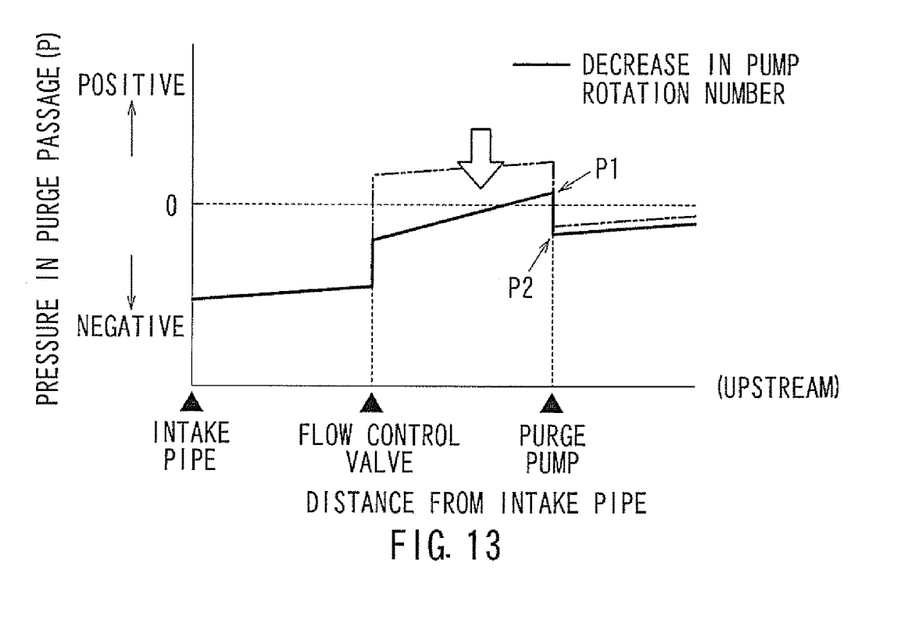
FIG. 13 is a graph showing inner pressure of the purge passage of the fuel vapor recovery apparatus while the pressure regulator is operated.

Next, a fuel vapor recovery apparatus 40 according to a third embodiment will be described based on FIGS. 10 to 15. In the fuel vapor recovery apparatus 40, the flow control valve 26v is located downstream of the purge pump 26p as shown in FIG. 10. Other configurations of the fuel vapor recovery apparatus 40 are same with those of the fuel vapor recovery apparatus 20 of the first embodiment. That is, in the fuel vapor recovery apparatus 40 according to the third embodiment, the flow control valve 26v is provided at the purge passage 26 and is positioned between the intake pipe 16 of the engine 14 and the purge pump 26p.

Accordingly, under both a first condition where the purge pump 26p is stopped (FIG. 11) and a second condition where the purge pump 26p is running (FIG. 12), the inner pressure of the purge passage 26 downstream of the flow control valve 26v is negative due to influence of the negative pressure in the intake pipe 16 of the engine 14. However, in an upstream region of the flow control valve 26v, there is a possibility that while the purge pump 26p is driven, the absolute value |P1| of the pressure P1 at the output side of the purge pump 26p becomes greater than the absolute value |P2| of the pressure P2 at the inlet side of the purge pump 26p. In such case, the ECU 19 performs the pressure control 26p by decreasing the rotation number N of the purge pump 26p, increasing the valve opening amount of the flow control valve 26v or decreasing the pressure in the intake pipe 16 of the engine 14. Of course, the ECU 19 may perform the pressure control by simultaneously carrying out at least two of them. The pressure control by decreasing the rotation number N of the purge pump 26p (FIG. 13) and decreasing the pressure in the intake pipe 16 of the engine 14 (FIG. 15) are substantially same with those of the first embodiment, so that they will not be explained again.

Figure 14:
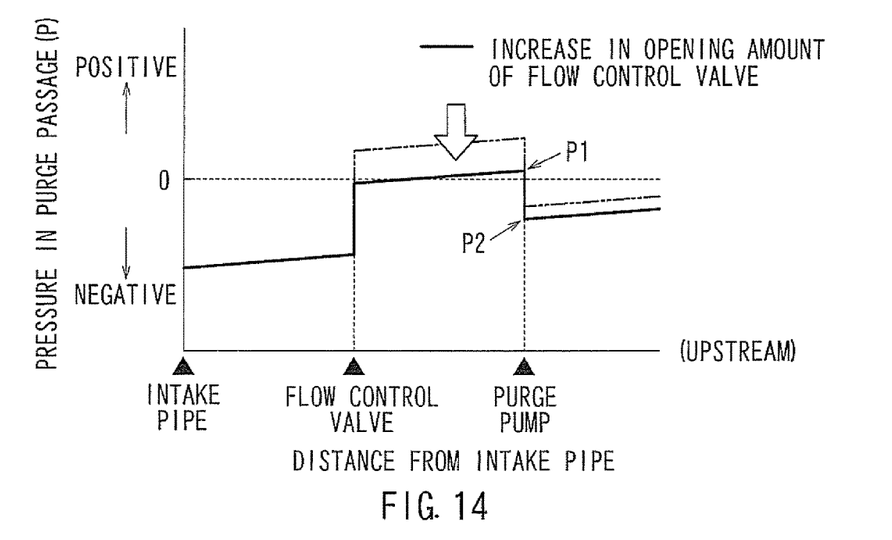
FIG. 14 is a graph showing inner pressure of the purge passage of the fuel vapor recovery apparatus while the pressure regulator is operated.
Figure 15:
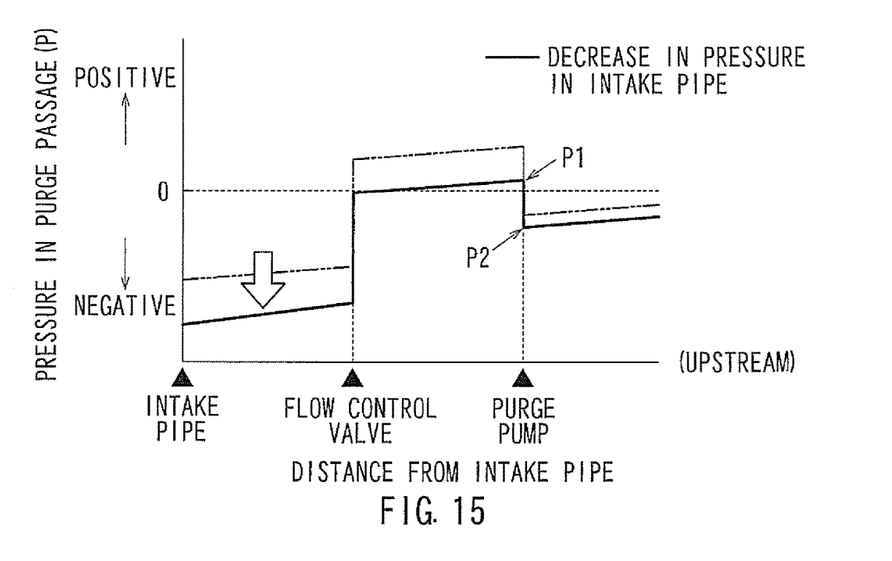
FIG. 15 is a graph showing inner pressure of the purge passage of the fuel vapor recovery apparatus while the pressure regulator is operated.

When the ECU 19 increases the opening amount of the flow control valve 26v, the pressure loss at the flow control valve 26v decreases such that influence of the negative pressure in the intake pipe 16 on the upstream region of the flow control valve 26v becomes larger. Thus, the pressure P1 at the outlet side of the purge pump 26p, which is located upstream of the flow control valve 26v, decreases as shown in FIG. 14, so that the absolute value |P1| of the pressure P1 at the outlet side of the purge pump 26p decreases. Consequently, the absolute value |P1| becomes less than the absolute value |P2|. Accordingly, when the engine 14 and the purge pump 26p are stopped, the pressure P1 (positive pressure) at the outlet side and the pressure P2 (negative pressure) at the inlet side counteract each other, and then the inner pressure of the purge passage 26 becomes negative, so that the diffusion of the fuel vapor stored in the adsorbent canister 22 to the outside via the atmospheric air passage 28 can be prevented or reduced.

Figure 16:
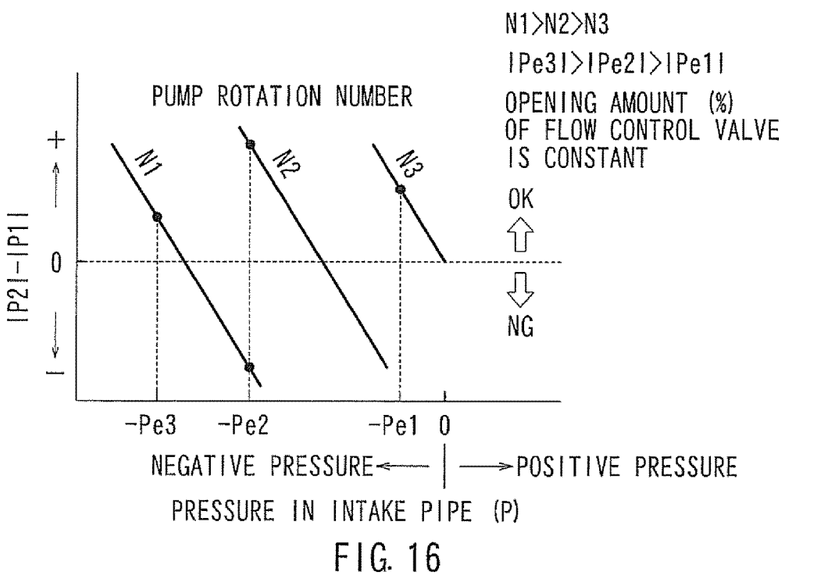
FIG. 16 is a map showing relationship between a difference between an absolute value |P1| of pressure P1 at an outlet side of the purge pump and an absolute value |P2| of pressure P2 at an inlet side of the purge pump, rotation number of the purge pump, pressure in an intake pipe, and an opening amount of a flow control valve, according to a fourth embodiment.

In the first to third embodiments, the pressure sensors 26s and 26y are provided at the outlet side and the inlet side of the purge pump 26p in order to detect the pressure P1 at the outlet side and the pressure P2 at the inlet side, respectively. On the other hand, in a fourth embodiment, the ECU 19 has a memory storing a map, which has been prepared previously based on a relationship between a subtracted value |P2|-|P1|, the rotation number N of the purge pump 26p, the pressure (negative pressure) in the intake pipe 16 of the engine 14, and the valve opening amount of the flow control valve 26v, as shown in FIG. 16, and is configured to estimate a difference between the absolute values |P1| and |P2|, i.e., the subtracted value (|P2|-|P1|), based on the map. That is, when the subtracted value |P2|-|P1| is greater than 0, the absolute value |P1| is smaller than the absolute value |P2|, so that the inner pressures of the purge passage 26 and the adsorbent canister 22, which communicates the purge passage 26, become negative after the purge pump 26p is stopped.

For example, in FIG. 16, under a condition where the opening amount (%) of the flow control valve 26v is kept at a constant value, when the inner pressure of the intake pipe 16 of the engine 14 is −Pe2 (kPa), it is able to make the subtracted value |P2|-|P1| larger than 0 by decreasing the rotation number of the purge pump 26p from N1 to N2. Alternatively, the inner pressure of the intake pipe 16 of the engine 14 can be increased to −Pe3 (kPa) while keeping the rotation number of the purge pump 26p at N1 in order to make the subtracted value |P2|-|P1| larger than 0. Further, if the pressure in the intake pipe 16 of the engine 14 decreases to −Pe1 (kPa), the rotation number of the purge pump 26p can be decreased to N3 in order to make the subtracted value |P2|-|P1| larger than 0. In this way, it is able to omit the pressure sensors 26s and 26y by estimating the pressures based on the map, thereby decreasing production cost.

FIG. 16 shows the map used for calculating the subtracted value |P2|−|P1| based on the relationship between the rotation number N of the purge pump 26p and the inner pressure of the intake pipe 16 of the engine 14 under the condition where the opening amount (%) of the flow control valve is kept at the constant value. On the other hand, it is able to prepare a map used for estimating the subtracted value |P2|−|P1| based on a relationship between the rotation number N of the purge pump 26p and the opening amount (%) of the flow control valve 26v under a condition where the inner pressure of the intake pipe 16 is kept at a constant value.

Figure 17:
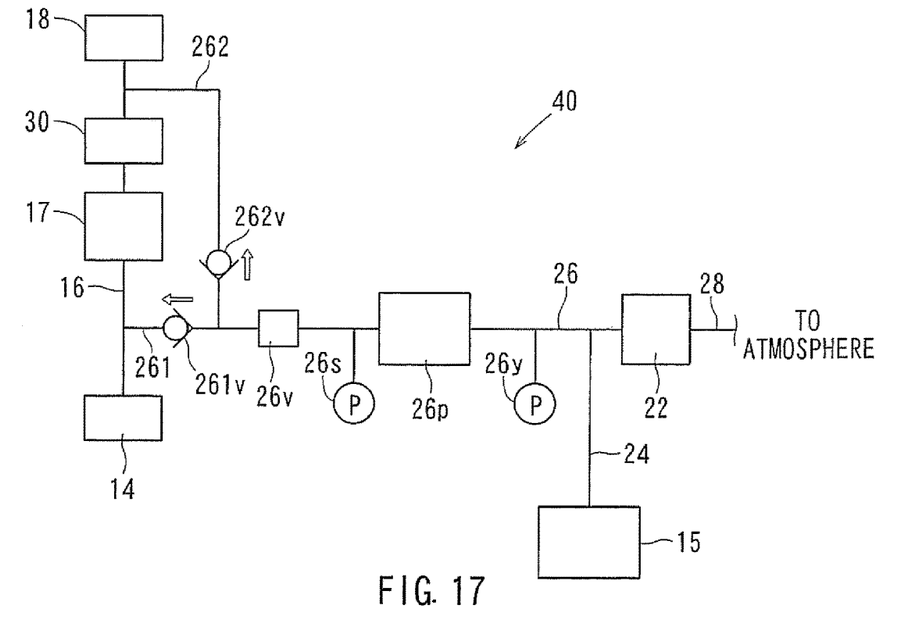
FIG. 17 is a schematic block diagram of the fuel vapor recovery apparatus according to a fifth embodiment.

In a fifth embodiment, the fuel vapor recovery apparatus 40 is used for the engine 14 having the supercharging device 30 as shown in FIG. 17. Other configurations of the fuel vapor recovery apparatus 40 according to the fifth embodiment are same with those of the third embodiment, and thus will not be explained repeatedly. Of course, the pressure sensors 26s and 26y may be omitted by using the map described in the fourth embodiment.

Further, although the purge passage 26 and the vapor passage 24 are communicated with each other via the adsorbent canister 22 in the above-described embodiments, the purge passage 26 and the vapor passage 24 may be directly coupled to each other as shown by each dashed line in FIGS. 2 and 10.

What is claimed is:

1. A fuel vapor recovery apparatus comprising:
   an adsorbent canister capable of capturing fuel vapor;
   a vapor passage connecting the adsorbent canister to a fuel tank;
   an atmospheric air passage communicating the adsorbent canister with the atmosphere;
   a purge passage coupling the adsorbent canister to an intake pipe of an internal combustion engine;
   a purge pump configured to generate a gas flow from the adsorbent canister to the intake pipe through the purge passage;
   a flow control valve provided at the purge passage and configured to regulate the gas flow through the purge passage; and
   a pressure regulator configured to compare an absolute value of pressure at an outlet side of the purge pump with an absolute value of pressure at an inlet side of the purge pump under a condition where the purge pump is driven and where the pressure at the outlet side of the purge pump is positive and to make the absolute value of the pressure at the outlet side of the purge pump smaller than the absolute value of the pressure at the inlet side of the purge pump when the absolute value of the pressure at the outlet side of the purge pump is greater than the absolute value of the pressure at the inlet side of the purge pump.

2. The fuel vapor recovery apparatus according to claim 1,
   wherein the purge pump is provided at the purge passage downstream of the flow control valve in a direction of the gas flow, and
   wherein the pressure regulator is configured to perform at least one of decreasing a rotation number of the purge pump, decreasing pressure in the intake pipe of the engine and decreasing a valve opening amount of the flow control valve in order to make the absolute value of the pressure at the outlet side of the purge pump smaller than the absolute value of the pressure at the inlet side of the purge pump.

3. The fuel vapor recovery apparatus according to claim 1,
   wherein the purge pump is provided at the purge passage upstream of the flow control valve in a direction of the gas flow, and
   wherein the pressure regulator is configured to perform at least one of decreasing a rotation number of the purge pump, decreasing pressure in the intake pipe of the engine and increasing a valve opening amount of the flow control valve in order to make the absolute value of the pressure at the outlet side of the purge pump smaller than the absolute value of the pressure at the inlet side of the purge pump.

4. The fuel vapor recovery apparatus according to claim 1, further comprising:
   a first pressure sensor provided at the purge passage and configured to detect the pressure at the outlet side of the purge pump; and
   a second pressure sensor provided at the purge passage and configured to detect the pressure at the inlet side of the purge pump.

5. The fuel vapor recovery apparatus according to claim 1,
   wherein the pressure regulator stores a map that is prepared based on a relationship between a rotation number of the purge pump, a pressure in the intake pipe of the engine, a valve opening amount of the flow control valve and a difference between the absolute value of the pressure at the inlet side of the purge pump and the absolute value of the pressure at the outlet side of the purge pump, and
   wherein the pressure regulator is configured to estimate the difference between the absolute value of the pressure at the inlet side of the purge pump and the absolute value of the pressure at the outlet side of the purge pump based on the map.

* * * * *